（12) United States Patent
Smits

(10) Patent No.: US 12,220,960 B2
(45) Date of Patent: Feb. 11, 2025

(54) METHOD FOR ADAPTING A TRANSFER FUNCTION OF AN ACTIVE SUSPENSION OF A VEHICLE

(71) Applicant: Continental Automotive GmbH, Hannover (DE)

(72) Inventor: Thomas Smits, Straelen (DE)

(73) Assignee: Continental Automotive GmbH, Hannover (DE)

( * ) Notice: Subject to any disclaimer, the term of this patent is extended or adjusted under 35 U.S.C. 154(b) by 726 days.

(21) Appl. No.: 17/309,826

(22) PCT Filed: Dec. 3, 2019

(86) PCT No.: PCT/EP2019/083507
§ 371 (c)(1),
(2) Date: Jun. 21, 2021

(87) PCT Pub. No.: WO2020/126480
PCT Pub. Date: Jun. 25, 2020

(65) Prior Publication Data
US 2022/0072924 A1     Mar. 10, 2022

(30) Foreign Application Priority Data
Dec. 21, 2018   (DE) ............. 10 2018 222 762.4

(51) Int. Cl.
*B60G 17/0165*     (2006.01)
(52) U.S. Cl.
CPC .. *B60G 17/0165* (2013.01); *B60G 2600/0422* (2013.01); *B60G 2800/702* (2013.01); *B60G 2800/87* (2013.01)

(58) Field of Classification Search
None
See application file for complete search history.

(56) References Cited

U.S. PATENT DOCUMENTS

| 9,807,172 B2 | 10/2017 | Fan et al. |
|---|---|---|
| 2011/0060478 A1 | 3/2011 | Nickolaou |

(Continued)

FOREIGN PATENT DOCUMENTS

| DE | 10012131 B4 | 9/2001 |
|---|---|---|
| DE | 10320809 A1 | 11/2004 |

(Continued)

OTHER PUBLICATIONS

Mercedes-Benz "Magic Body Control", Newsletter, 2013, https://www.mercedes-benz.com/de/mercedes-benz/innovation/magic-body-control/.

(Continued)

*Primary Examiner* — Lail A Kleinman

(57) ABSTRACT

A method for adapting a transfer function of an active suspension of a vehicle comprises the vehicle driving along a section of road for which a surface profile is stored in a control unit of the vehicle. The active suspension is activated according to a predetermined transfer function for adaptation to the surface profile by means of adjustment values in order to compensate for unevenness of the surface profile. A shock absorber sensor system and/or a tire sensor system of the vehicle is used to record vertical accelerations while driving along the section of road and transfer them to the control unit. The invention provides that the adjustment values and the vertical accelerations are transferred by the vehicle to an external central computer.

6 Claims, 5 Drawing Sheets

(56) References Cited

U.S. PATENT DOCUMENTS

| | | | |
|---|---|---|---|
| 2013/0035836 A1 | 2/2013 | Mehr et al. | |
| 2014/0195112 A1* | 7/2014 | Lu .................. | B60G 17/015 703/2 |
| 2016/0325595 A1 | 11/2016 | Wagner et al. | |
| 2018/0079272 A1* | 3/2018 | Aikin ................. | B60W 10/22 |
| 2021/0224917 A1* | 7/2021 | Gaudin ............... | B60W 50/14 |

FOREIGN PATENT DOCUMENTS

| | | | | |
|---|---|---|---|---|
| DE | 102010035235 A1 | 4/2011 | | |
| DE | 102014016121 A1 | 5/2016 | | |
| DE | 102015005964 A1 | 11/2016 | | |
| DE | 102016003116 A1 | 9/2017 | | |
| DE | 102016225351 A1 | 6/2018 | | |
| EP | 1449688 A2 | 8/2004 | | |
| FR | 2957306 A3 | 9/2011 | | |
| FR | 3074726 A1 * | 6/2019 | ......... | B60G 17/0165 |
| WO | 2011/100943 A1 | 8/2011 | | |
| WO | 2016/118887 A1 | 7/2016 | | |

OTHER PUBLICATIONS

Ruediger Abele "Highly Precise Map for Autonomous Driving", Newsletter, 2016, https://www.mercedes-benz.com/de/mercedes-benz/next/vernetzung/hochpraezise-landkarte-fuers-autonome-fahren/.
Search Report dated Oct. 8, 2019 from related German Application No. DE 10 2018 222 763.2.
Search Report dated Aug. 14, 2019 from corresponding German Patent Application No. DE 10 2018 222 762.4.
Search Report and Written Opinion dated Mar. 30, 2020 from corresponding International Patent Application No. PCT/EP2019/083507.

* cited by examiner

METHOD FOR ADAPTING A TRANSFER FUNCTION OF AN ACTIVE SUSPENSION OF A VEHICLE

CROSS-REFERENCE TO RELATED APPLICATIONS

This U.S. patent application claims the benefit of PCT patent application No. PCT/EP2019/083507, filed Dec. 3, 2019, which claims the benefit of German patent application No. 10 2018 222 762.4, filed Dec. 21, 2018, both of which are hereby incorporated by reference.

TECHNICAL FIELD

The invention relates to a method for adapting a transfer function of an active suspension of a vehicle. The invention also comprises a vehicle with an active suspension, and a central computer unit.

BACKGROUND

Active suspensions are fitted in vehicles and can reduce vertical accelerations of a vehicle due to unevenness in a section of road that is being driven along. These suspensions preventively adjust for example a height setting or the damper characteristic for one or more wheels of the vehicle in order to preventively compensate for unevenness in a surface profile of the section of road. The use of an active suspension is useful for autonomous vehicles, because the vehicle occupants are not occupied with controlling the vehicle and can thus pursue other activities. Due to the unevenness of the surface profile, motion sickness, also known as kinetosis, can easily occur.

However, preventive intervention by an active suspension requires that, in order to control the active suspension, the surface profile of the section of road is known before the vehicle is driven along it. For this purpose, vehicles are fitted with sensor devices such as stereoscopic cameras or lidar recording systems, which record the surface profile of the section of road in front of the vehicle. In this way, unevenness can be recorded before being driven over by the vehicle and the active suspension can be adjusted accordingly.

In addition to knowing the surface profile of the section of road as precisely as possible, it is necessary for the active suspension to function properly that a transfer function, which defines the adjustment values of the active suspension, is adapted to the vehicle. If the transfer function for the vehicle and the active suspension are not designed accordingly, increased vertical accelerations of the vehicle can occur when driving over an unevenness. An incorrect design of the transfer function can result from deviations of an individual suspension from a prototypical design model. These deviations may be attributable to the aging process of the active suspension and the respective stress on the active suspension.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is an object of the invention to adapt a transfer function for the feedback control of an active suspension to the individual active suspension.

A method for adapting a transfer function of an active suspension of a vehicle is provided. The method provides that the vehicle drives along a section of road for which a surface profile is stored in a control unit of the vehicle. The active suspension is activated by the control unit according to a predetermined transfer function for adaptation to the surface profile by means of an adjustment value in order to compensate for unevennesses of the surface profile. A shock absorber sensor system and/or a tire sensor system of the vehicle are/is used to record vertical accelerations while driving along the section of road and transfer them to the control unit. It is provided that the adjustment value and the vertical accelerations are transferred by the vehicle to an external central computer.

In other words, the method relates to an optimization of the transfer function, which defines a feedback control of the active suspension of the vehicle by the control unit. The method provides for the vehicle to drive along the section of road. For the section of road, the surface profile, which contains height data of the section of road, is stored in the control unit of the vehicle. In order to minimize vertical accelerations of the vehicle when driving along the section of road, the active suspension is controlled by feedback control by the control unit. The control unit controls the active suspension by feedback control by calculating adjustment values for the surface profile according to the predetermined transfer function.

The transfer function is designed to compensate for unevennesses by activating the active suspension. These adjustment values are transferred to the active suspension by the control unit. The active suspension works according to the received adjustment values. Despite the active suspension, vertical accelerations of the vehicle take place while it is driving along the section of road. These vertical accelerations are recorded for later analysis by the shock absorber sensor system and/or the tire sensor system of the vehicle. It is provided that the adjustment values calculated by the control unit for the surface profile according to the predetermined transfer function are transferred by the vehicle to the external central computer together with the recorded vertical acceleration.

The adjustment values and the vertical accelerations are made available on the external central computer to optimize the transfer function.

It can be provided, for example, that the vehicle is a passenger car or a truck which is moving along the section of road. The section of road may be for example a street. This may have unevennesses, which can be described in the surface profile. The surface profile can be stored in the control unit. The control unit may comprise a microprocessor and/or a micro-controller. The control unit may be set up to take preventive measures in order to compensate for impending unevennesses by feedback control of the active suspension by means of adjustment values. In order to be able to control the active suspension accordingly by feedback control, the predetermined transfer function with which the adjustment values can be calculated is stored in the control unit. The surface profile, a current geographical position of the vehicle, a current speed, a respective alignment of the wheels and/or a weight of the vehicle may be provided as input variables for the predetermined transfer function.

The active suspension may for example comprise an active damping system with an adjustable rebound stage and compression stage. This may be designed as an air pressure version or with additional hydraulic adjustment for level compensation. The adjustment values may comprise a damping factor and/or valve settings of shock absorbers. It is provided that the output adjustment values and the recorded vertical accelerations are logged by the control unit and transferred by the vehicle to the external central computer. It may be provided that the transfer takes place for example via a mobile radio network to the external central computer. The external central computer may be for example a computer with a microprocessor or a computer network. If the adjustment values are provided by the external central computer, the vehicle does not need to send the adjustment values to the external central computer.

One development provides that the external central computer determines a deviation of the vertical accelerations from expected vertical accelerations calculated for the section of road by means of a vehicle-specific reference model. In other words, it is provided that the vertical accelerations that were recorded by the shock absorber sensor system and/or the tire sensor system of the vehicle while driving along the section of road are evaluated in the external central computer.

Using the vehicle-specific reference model, the computer determines the expected vertical accelerations that are to be expected for the surface profile and the adjustment values when driving along the section of road. These expected vertical accelerations are compared with the recorded vertical accelerations and the deviation is determined. The deviation thus describes the difference between the recorded vertical accelerations and the expected vertical accelerations. Therefore, deviations or malfunctions of the vehicle can be determined on the central computer. It may be provided for example that the control unit of the vehicle logs the recorded vertical accelerations. The recorded vertical accelerations can be transferred by the motor vehicle to the external central computer. For the section of road, the external central computer may use the reference model to determine which vertical accelerations are to be expected. The external central computer can compare the corresponding values with the values provided by the vehicle in order to determine the deviation.

One development provides that the reference model is adapted from the deviation by the central computer. In other words, it is provided that the reference model of the external central computer is adapted by the external central computer so that the deviation is reduced. This has the advantage that incorrect assumptions with regard to the reference model can be corrected in the central computer. It may be provided for example that the central computer evaluates the recorded vertical accelerations of one or more motor vehicles and compares them with the expected vertical accelerations. If there are deviations that exceed a predetermined threshold value, this can indicate that the reference model stored in the central computer is incorrect. In this case it may be provided that the reference model is adapted. This may be performed for example by means of a fit method, with the values of the reference model being adapted until the deviations are minimal.

One development provides that the external central computer generates an adapted transfer function from the deviation and transfers it to the control unit. The control unit replaces the predetermined transfer function with the adapted transfer function. In other words, the external central computer creates an adapted transfer function which was calculated on the basis of the deviations. The control unit replaces the predetermined transfer function with the adapted transfer function, whereby the future adjustment values are based on the adapted transfer function. The development results in that incorrect transfer functions of individual vehicles can be corrected. Due to series fluctuations or an aging process of the vehicle, the deviation for the vehicle may exceed a predetermined threshold value. In this case it may be provided that the central computer generates the adapted transfer function by means of a predetermined fit method.

One development provides that the adjustment values for the section of road are calculated by the external central computer according to the predetermined transfer function and transferred to the control unit for activating the active suspension. In other words, in this development the active suspension is controlled by the external central computer. The predetermined transfer function and the surface profile for the section of road are stored for this in the external central computer. The adjustment values are calculated by the external central computer and transferred to the vehicle. The vehicle forwards the adjustment values to the control unit, which controls the active suspension by feedback control by means of the adjustment values. The development results in that feed-back control of the active suspension by the external central computer is made possible. It may be provided for example that the central computer sends the adjustment values for the active suspension to the vehicle after the vehicle has requested them for the section of road. The central computer can calculate the adjustment values and transfer them to the vehicle. The adjustment values may for example comprise valve positions of dampers of the active suspension calculated for the section of road.

One development provides that the surface profile is generated by a sensor device of the vehicle and transferred to the control unit. In other words, the vehicle comprises the sensor device which is set up to record and generate the surface profile of the present section of road. The surface profile is therefore recorded while the section of road is being driven along or on a previous occasion when the section of road was driven along by the vehicle itself. This results in that the vehicle itself makes it possible for the surface profile to be provided and the method can be operated independently of a connection to the external central computer or a pre-existing database of the control unit. It may for example be provided that the sensor device comprises a radar, lidar or camera unit which is set up to record the surface of the section of road before driving along it and to generate the surface profile. The surface profile can then be transferred to the control unit and stored by it.

One development provides that the surface profile is transferred to the external central computer by the vehicle. In other words, it is provided that the vehicle sends the surface profile of the section of road recorded by means of the sensor device to the external central computer. This surface profile driven along by the vehicle is made available to the external central computer. In this way, the surface profile can be taken into account when evaluating the adjustment value. It may for example be provided that, in addition to the adjustment value, the surface profile recorded by the vehicle is transferred to the external central computer.

One development provides that the surface profile is received by the control unit from the external central computer. In other words, the surface profile that is required by the control unit for feedback control of the active suspension is provided by the external central computer. The development results in that the surface profile is available for the control unit independently of a sensor device. It may for example be provided that the surface profile is actively requested by the control unit from the central computer when the vehicle is moving along the section of road. As an alternative to this, it may be provided that the external central computer initiates the transmission of the surface profile at a predetermined point in time.

A vehicle with an active suspension comprises a control unit which is set up to store a surface profile for a section of road. The control unit is also set up to calculate adjustment values according to a predetermined transfer function for adaptation to the surface profile and to activate an active suspension of the vehicle by means of the adjustment values. The vehicle has a shock absorber sensor system and/or a tire sensor system which is set up to record vertical accelerations while driving along the section of road and to transfer them to the control unit. It is provided that the vehicle is set up to send the adjustment values and the vertical accelerations to an external central computer.

TA central computer is set up to determine a deviation of a recorded vertical acceleration from an expected vertical acceleration calculated by means of a reference model, and to adapt the reference model on the basis of the deviation or to generate an adapted transfer function and transfer it to a control unit of a vehicle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

An exemplary embodiment of the invention is described below. In this respect.

DETAILED DESCRIPTION

In the exemplary embodiments below, the described components of the embodiments each represent individual features that should be considered independently of one another, and that each also develop the invention independently of one another and can therefore also be considered to be part of the invention individually or in a combination other than that shown. Furthermore, the embodiments described can also be supplemented by further features that have already been described.

In the figures, elements with the same function are each provided with the same reference signs.

Figure 1:
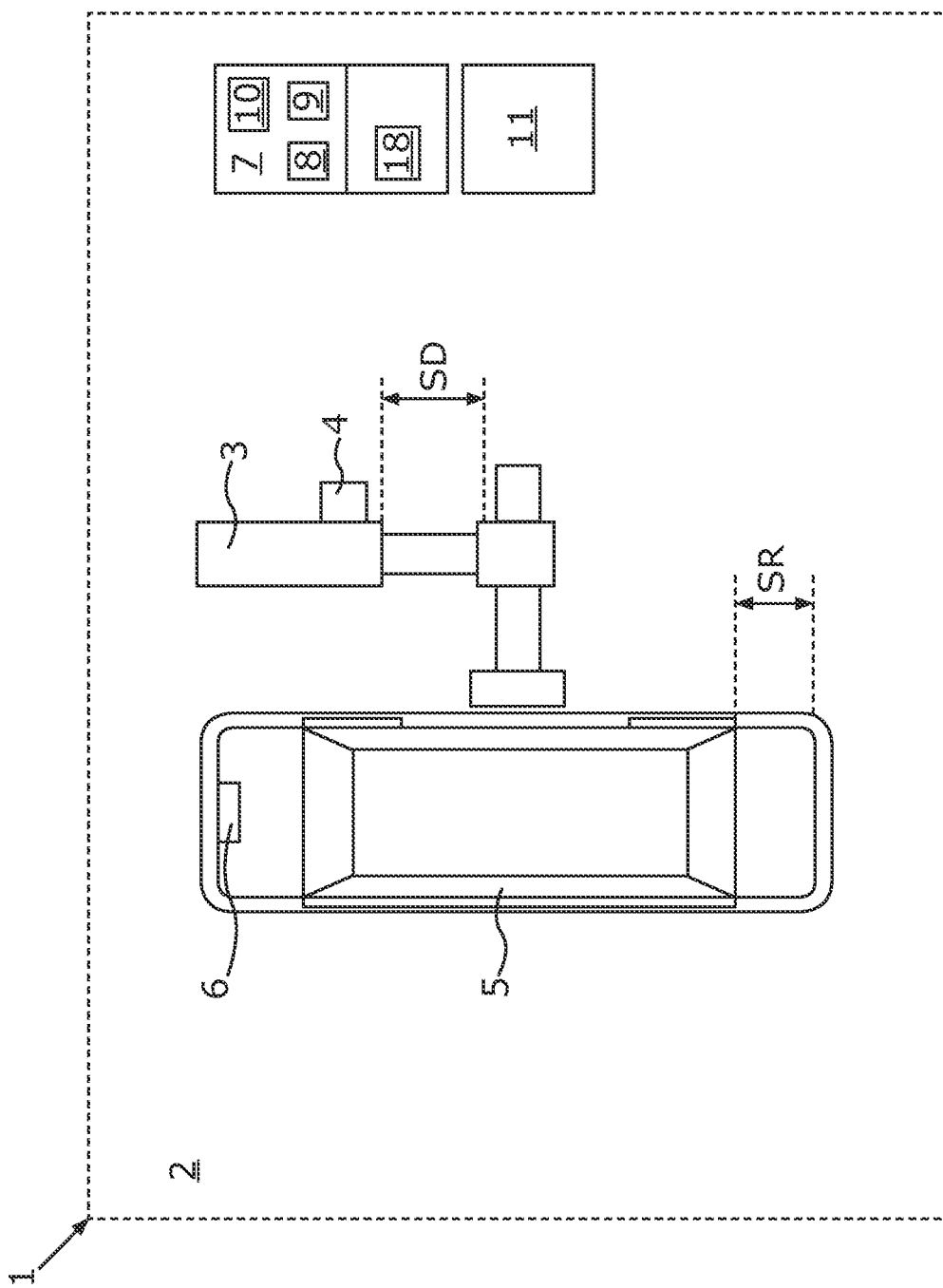
FIG. 1 shows a vehicle with an active suspension.

FIG. 1 shows a vehicle 1 with the active suspension 2. The vehicle 1 may be a truck or a passenger car. The vehicle 1 with the active suspension 2 may be a manually controlled vehicle or an autonomously controlled vehicle. The active suspension 2 may be set up to take into account unevenness of a road surface in order to thus reduce vertical accelerations of the vehicle. The active suspension 2 may comprise one or more shock absorbers 3, which can be set up to dampen shocks occurring on a vehicle axle. The shock absorber 3 may have a shock absorber sensor system 4 which can record the respective position of the shock absorber SD. The position of the shock absorber SD may vary due to the action of unevenness of the road surface. The active suspension 2 may comprise a tire 5 which has a tire sensor system 6. The tire sensor system 6 may for example record a pressure of the tire or a deformation of the tire. The recorded values can provide that the tire sensor system 6 determines a vertical and/or horizontal deformation of the tire SR. The vertical deformation of the tire SR may occur due to unevenness of the road. The deflection of the shock absorber and the deformation of the tire can be transmitted to the control unit 7. The control unit 7 may be set up to activate the active suspension by means of adjustment values in order to be able to compensate preventively for surface unevenness. For this purpose, the surface profile 8 can be stored in the control unit 7. The surface profile 8 may comprise the respective height values for a section of road to be driven along.

The adjustment values for the shock absorber 3, for example, may be created according to the predetermined transfer function 9 or the adapted transfer function 10. The activation of the shock absorber 3 by the control unit 7 may for example bring about a change in the height of the wheel or an adjustment of the damping strength of the shock absorber 3. The surface profile 8 may be provided for example by a sensor device 11 of the vehicle 1. This may be for example a lidar system, a radar system or an optical recording system which is set up to record the surface of the section of road.

Figure 2:
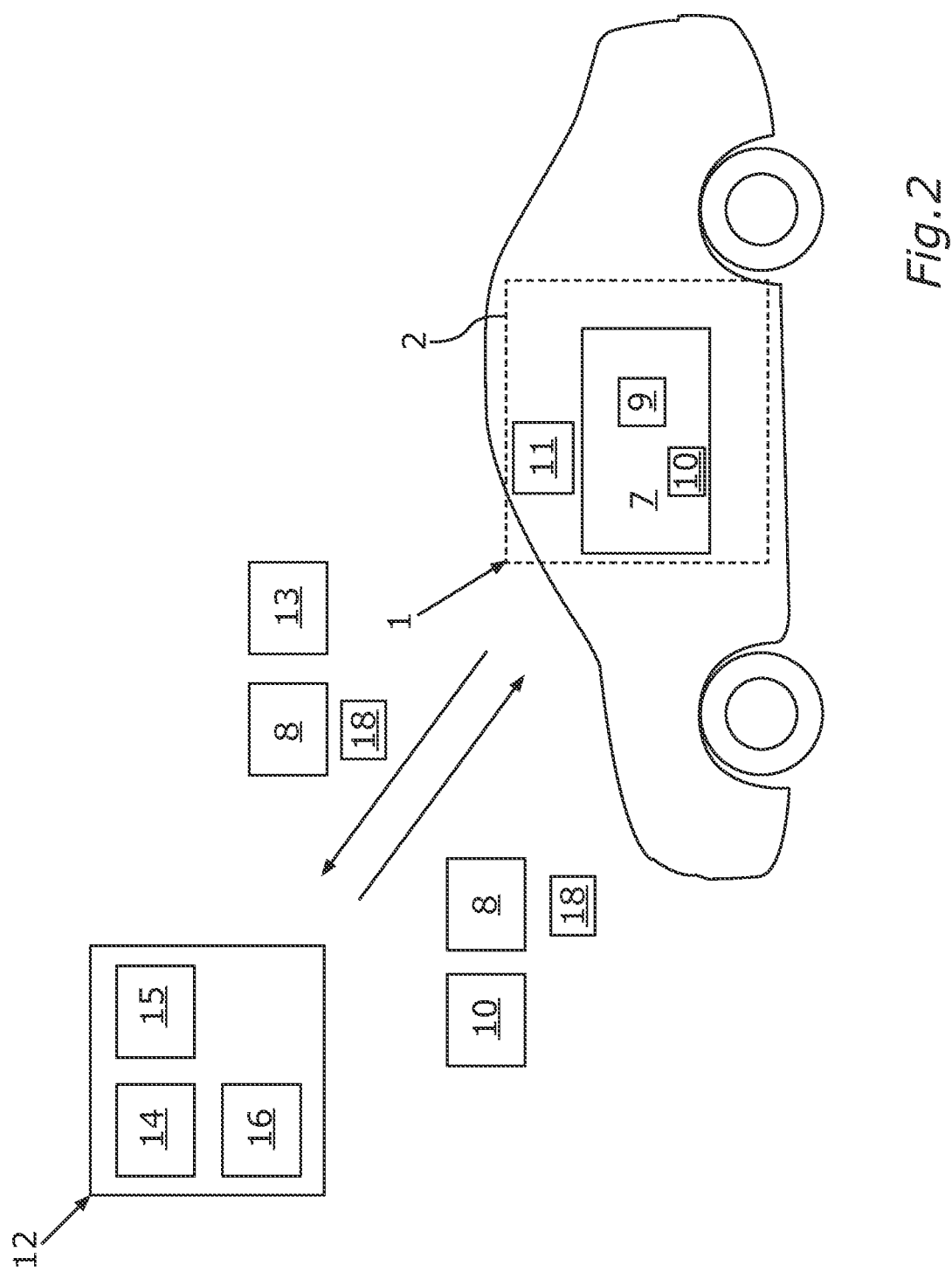
FIG. 2 shows a central computer.

FIG. 2 describes an external central computer. The external central computer 12 may for example have a microprocessor and be arranged outside the vehicle 1. The external central computer 12 may be set up to carry out data transfers with the vehicle 1. For example, it may be provided that the external central computer 12 provides surface profiles 8 for vehicles 1, or receives surface profiles 8 recorded by the sensor devices 11 of the vehicle 1. The task of the external central computer 12 may be to provide a requested surface profile 8 to a vehicle 1. The external central computer 12 may be set up to receive an adjustment value 18 of a vehicle 1 in order to evaluate it. The evaluation of the adjustment value 18 may have the purpose of replacing the transfer function 9 of a vehicle 1 with an adapted transfer function 10. This may be necessary for example if an aging process of components of the active suspension 2 requires a change in the adjustment value 18 of the vehicle 1.

The external central computer 12 can receive the adjustment value 18 received from the vehicle with input variables and output variables from the control unit 7 of the vehicle 1. To make a comparison possible, a reference transfer function 14 may be stored in the external central computer 12. This may for example be identical to the predetermined transfer function of the vehicle 1. By means of the reference model 14, the external central computer 12 can calculate the expected vertical accelerations 15. The expected vertical accelerations 15 for the section of road can thus be calculated.

In an ideal case, the expected vertical accelerations would have to match the recorded vertical accelerations. Due to manufacturing fluctuations or wear processes, there may be deviations 16 between expected vertical accelerations and recorded vertical accelerations. The deviation may thus indicate that the predetermined transfer function 9 used by the control unit of the vehicle 1 is incorrect and must be replaced by the adapted transfer function 10. The adapted transfer function 10 may be generated by the external central computer for example by means of a fit process, with individual parameters being able to be fitted in order to reduce the deviation 16.

It may be provided that the method described is carried out by the external central computer 12 for a number of vehicles 1. The deviations 16 between the expected vertical accelerations 15 and the vertical accelerations recorded by the individual vehicles 1 can be determined. If there are deviations 16 that exceed a predetermined threshold value, this may indicate that the reference model 14 is unsuitable. In this case, the fit method may be carried out on parameters of the reference model 14 in order to minimize the deviations 16.

Figure 3:
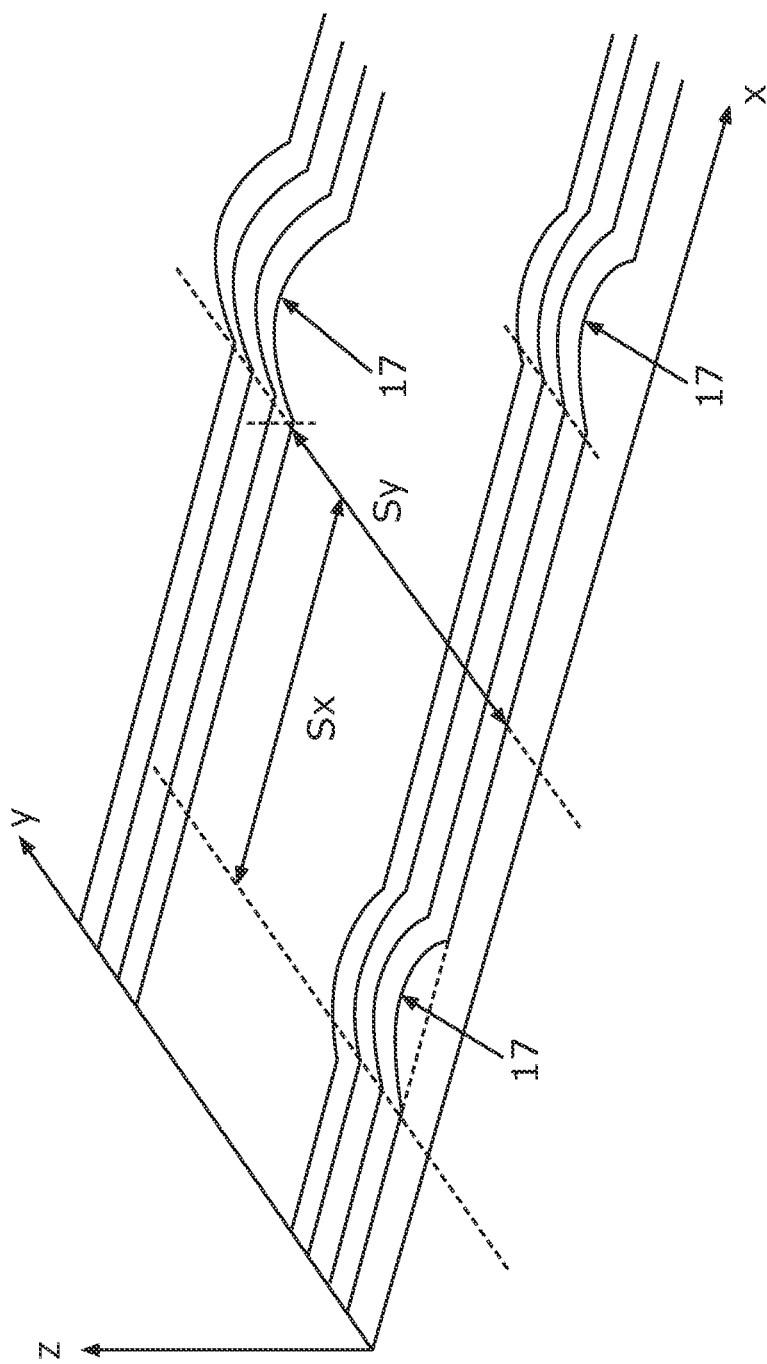
FIG. 3 shows a surface profile.

FIG. 3 shows a surface profile. The surface profile 8 may have been generated by the control unit 7 of the vehicle 1 on the basis of the shock absorber position SD, the tire deformation SR and/or recorded values of the sensor device 11. The surface profile 8 may have a coordinate system, where x indicates a direction along the direction of travel, y the width of the road and z the height. The surface profile 8 shown shows unevenness 17 in the form of bumps which occur along a section of road. The position of the unevennesses 17 may be described for example within the x-y plane. A distance Sx may be present between two of the unevennesses 17 shown along the x direction and a distance Sy in the y direction. The distances Sx and Sy may also be used by the vehicle 1 to synchronize the current geographical position. Therefore, the number of operating data and geographical positions by means of a suitable predetermined compression are reduced. In this way, straight or neutral sections of road that have no relevant effect on the feedback control can be bridged or compressed in an appropriate way. The distance to the next distinctive point in the x and y directions can thus be stored.

Figure 4:
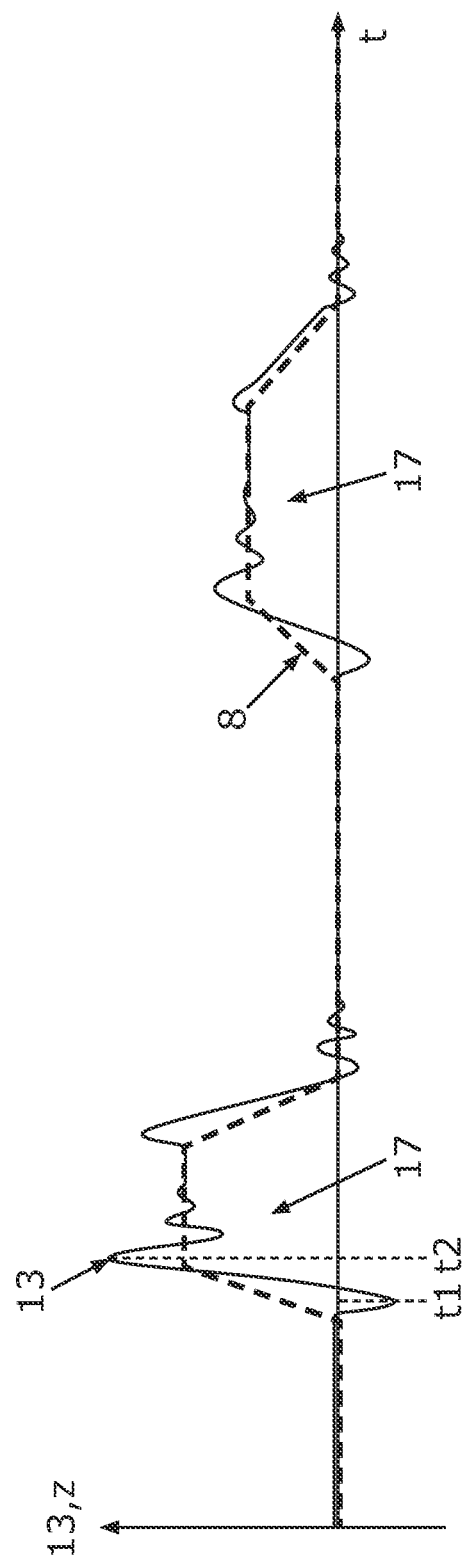
FIG. 4 shows a further surface profile.

FIG. 4 shows a surface profile. The figure shows a temporal progression of the shock absorber position SD over time. The shock absorber position SD may be for example a deflection of the shock absorber 3 from a central position that was recorded by the shock absorber sensor system 4. The vehicle 1 may have driven over two unevennesses 17 along the section of road. This may have resulted in a vertical acceleration 13 of the vehicle 1. The progression of the line shows an undershoot at a point in time t1 and an overshoot at a point in time t2 due to the unevennesses 17. The control unit 7 can determine the progression of the surface profile 8 from the progression of the shock absorber position SD. It may be provided that the geographical position and the shock absorber position SD are recorded at predetermined points in time. This means that a respective geographical position can be assigned to a respective value of the shock absorber position SD over time. It is thus possible that a local assignment of the unevennesses 17 can take place from the temporal progression of the shock absorber position SD.

Figure 5:
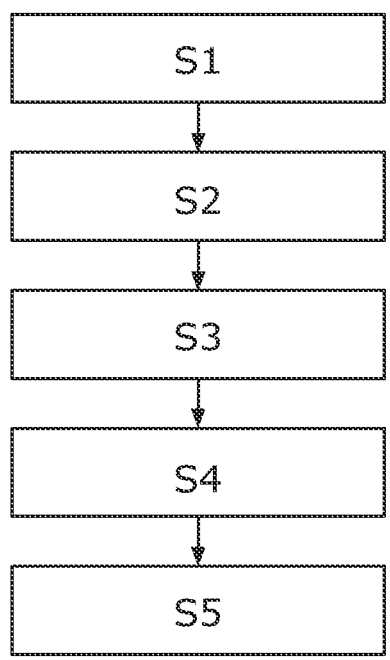
FIG. 5 shows a method sequence.

FIG. 5 shows a possible sequence of a method. In a first step S1, it may be provided that the surface profile 8 is transferred to the vehicle 1 by the external central computer 12. This may take place for example on the basis of a request from the vehicle 1 to the external central computer 12, the surface profile 8 being requested for a section of road lying in front of the vehicle 1. As an alternative to this, the surface profile 8 of the section of road may be recorded by the sensor device 11 of the vehicle 1 prior to driving along it and transferred to the control unit 7. The recording may take place for example by means of lidar or a camera. The surface profile 8 may also be known from a previous trip by the vehicle 1. During the previous trip, the shock absorber position SD and the tire deformation SR may have been recorded and evaluated by the control unit 7 to determine the surface profile 8.

If the vehicle 1 drives along the section of road, the control unit 7 can activate the active suspension 2 on the basis of the surface profile 8 stored in the control unit 7 in order to be able to compensate for unevenness (S2). The adjustment values 18 can be generated by the control unit 7 according to the predetermined transfer function 9. For example, depending on the surface profile 8, a damping strength of the shock absorber 3 can thus be increased or reduced. In the feedback control, it may be provided that a respective tire pressure is taken into account in order to take into account the damping caused by the tires 5. From a current geographical position of the vehicle 1, the wheel positions and a current speed of the vehicle 1, the control unit 7 can predict a trajectory of a respective wheel. The height profile driven along by the wheel can thus be determined and a respective level feedback control of the wheels can be carried out by the active suspension 2 in order to compensate for unevenness 7 and/or to minimize vertical accelerations. The adjustment values required for this can be calculated by the control unit 7 by means of the transfer functions 9, 10. To check the transfer functions 9, 10, the shock absorber position SD can be recorded by the shock absorber sensor system 4 and/or the tire deformation SR by the tire sensor system 6, whereby the vertical acceleration of the vehicle 1 can be determined while driving along the section of road.

In a step S3, it may be provided that the vehicle 1 transfers the adjustment values and the recorded vertical acceleration to the external central computer.

The external central computer 12 can receive and store the received adjustment values 18 and the recorded vertical accelerations of the vehicle 1. In order to make an evaluation of the adjustment value 18 possible, and possibly an adaptation of the transfer function 9 stored in the vehicle, it may be provided that the external central computer 12 calculates the adjustment values 18 according to a reference model 14. The external central computer can determine the deviations 16 between the recorded vertical acceleration and the expected vertical acceleration. On the basis of the deviations 16, the predetermined transfer function 9 can be replaced by the adapted transfer function 10, for which a smaller deviation 16 is predicted according to a predetermined method by evaluating the adjustment values and the recorded vertical accelerations. In a step S5, the adapted transfer function 10 can be sent to the vehicle. In the control unit 7 of the vehicle 1, the predetermined transfer function 9 can be replaced by the adapted transfer function 10. The future adjustment values 18 are thus generated according to the adapted transfer function 10.

A stability system with an active suspension has already been available in series for several years. The system tries to create optimal comfort by compensating for bumps and unevenness in roads with an air suspension system. For this purpose, the bumps directly in front of the vehicle 1 are measured with a 3D camera. In addition, with the help of hydraulic cylinders on the suspension struts, the system can reduce body tilts when cornering and pitching movements when braking and starting.

At the same time, high-precision maps for autonomous driving are now being created by various providers, by recording the lane or the surroundings with the vehicle's own sensor system (cameras, lidar, etc.). The maps offer inter alia: the number and width of the lanes, details such as the gradient and curve of the road, and lane markings and objects at the edge of the lane such as traffic signs and their information.

The accuracy is under 0.5 m in the longitudinal direction of a section of road and under 15 centimeters laterally. With stereo camera variants, the recording accuracy is up to 3 mm.

The stereo camera variants only work during the day and in good weather, since the recording has to meet very demanding requirements. A dedicated stereo camera is also required for the front area directly in front of the vehicle. Due to the contrary requirements, this cannot be used, or can be used only to a very limited extent, at the same time for a medium distance and the far range.

Therefore, almost perfect feedback control of the suspension is possible. This is of interest in particular for autonomous vehicles, since the free time available for the driver and other occupants can then be used for other purposes and "motion sickness" or travel sickness (kinetosis) can easily occur.

On the one hand, the system presented is intended to make highly accurate recording of the road profile possible via the suspension or tire sensor system with other existing sensors. In addition, the profile of the road is intended to be recorded with the highest resolution and as completely as possible, and continuously kept up to date. Furthermore, almost perfect feedback control is to be achieved through the collaborative recording and adaptation of the control deviation of the damping and/or feedback control system.

Various aspects are intended to lead in combination to an optimal feedback control of the suspension, such as a robust, accurate and always up-to-date recording of the road.

For this purpose, the vehicles are to access highly accurate map data, but also deliver updates back to the cloud or the backend. The highly accurate recording of the road can use the previously known sensor systems (3D stereo camera, surround cameras, lidar, inertial sensor system, inclination and tilt sensor systems, GPS/GNSS, etc. and corresponding merging of all the sensors). In addition, the position/movement of the shock absorbers, the damping system or the adjustment values or position of the active damping system of each individual damper can be used as a sensor for recording the road or the exact road profile.

Instead of the previous sensor data given, the suspension information (used as a sensor) can also be sent back to the cloud. In one variant, the tire can also be used as a sensor. Together with the damper system, this forms contact with the road. Together with the actuator system (active suspension), the vehicle parameters and the sensor systems already mentioned above, this control loop can be fully or at least largely described. The tire deforms according to the forces acting on it (acceleration, depending on the course of the road/slope/height profile, vehicle weight, occupants or load, current damper characteristics).

The deformation of the tires can be determined in different ways. It is conceivable to measure the tire pressure by means of strain gages or piezo sensors by means of ultra-sound (height measurement, for example within the tire), see also FIG. 1. This can be carried out because of the continuous data acquisition and wireless transmission.

The localization of the vehicle 1 in the environment model can be achieved with the usual sensors provided for this purpose (lidar, radar, surround cameras, GPS, V2X). In addition, the localization may take place via synchronization with the mapped bumps or unevenness. A correlation of the different positions of the bumps in relation to one another or, with a corresponding extent or accuracy of the system, also characteristic features, such as for example the beginning or apex of the bump, can be determined itself, see also FIG. 3.

Taking into account further parameters, such as vehicle type and design and the corresponding deviations between the vehicles, the data can be brought together by being collaboratively gathered in the external central computer 12 and evaluated.

In addition, the parameter drift due to aging of the sensor systems 4, 6 or other elements that influence the recording may be determined. This can be recognized in the external central computer 12 by means of deviations 16 from the data record stored in the central computer 12. The external central computer 12 can determine correction factors in order to compensate for the individual deviations. These can be stored in the adapted transfer function 10 for the respective vehicle 1 and be transferred to the vehicle. In this step it is also possible to compensate for deviations 16 in the actuator system of the active suspension 2.

Adjustment values 18 can be made possible by means of a collaborative optimization of the reference model 14. In addition to the exact recording of the surface profile 8 of a road and the determination of possible deviations of the sensor systems 4, 6, 11, in a further step the adapted reference model 14 determined and/or learned or trained in the external central computer 12 is to be used (similar to autonomous driving) to generate the adapted transfer function 10 for a respective vehicle 1. For the distance to be covered, the respective surface profile 8 and the adapted transfer function 10 can be transmitted to the vehicle 1 as a precaution. The resulting deviation 16 of the recorded vertical accelerations of the vehicle 1 from the expected vertical accelerations 15 is then to be checked for plausibility and/or analyzed by the external central computer 12. As part of this process, the external central computer 12 can examine whether the deviation 16 is attributable to disturbance variables or has occurred in the vehicle 1 due to a not yet "perfectly" adapted transfer function 10. If the recorded vertical acceleration of the adapted transfer function 10 still deviates, this is stored in the external central computer 12, and an attempt is made in the external central computer 12 to optimize the adapted transfer function 10 or the adjustment values calculated with it.

This can then be made available to and used by the next vehicle 1, which creates "stimulus data" under a corresponding setup, that is to say travels along the same position of the surface profile 8. As long as the deviation 16 is not yet sufficiently small, this process is repeated, that is to say the adapted transfer function 10 or the adjustment value is adapted. If, when activated by the control unit 7, the active suspension 2 works according to the adapted transfer function 10 for precisely this setup, i.e. under these input parameters for this position, so that the deviation 16 falls below a predetermined threshold value, the adapted transfer function 10 is retained in the control unit 7.

Deviations 16 due to changes in the surface profile 8 can be detected by means of synchronizing the input values, which may comprise the shock absorber position SD and the tire deformation SR (position matching). These can be uploaded to the external central computer 12 for updating in order to update a surface profile 8 stored in the external central computer 12. This only happens of course after a corresponding statistical and further plausibility check.

In one embodiment it is provided that a suitable compression is determined for the very large number of data. In this way, straight or neutral sections of road that have no relevant effect on the feedback control can be bridged or compressed in an appropriate way. The distance to the next distinctive point in the x and y directions can then be stored. The active suspension 2 may comprise a damping system, which may be purely passive (in the case of just recording) or an active damping system, for example with an adjustable rebound stage and compression stage, as an air pressure version or with additional hydraulic adjustment for level compensation. It may also be operated electrically/electro-mechanically and is not to be described any further here in a restrictive manner. At least it should be mentioned that the approach presented aims to achieve inter alia almost perfect feedback control for the active suspension 2 by means of providing an adapted transfer function 10. The actuator system of the active suspension 2 ideally covers a broad dynamic range in order to be able to compensate for both large deflections and unevenness 17 in the surface profile 8 and for the smallest movements.

Compensation may cover low to the highest frequencies. When the surface profile 8 is provided by the external central computer 12, the active suspension 2 is independent of the weather and also functions in rain, fog and in absolute darkness, because in this case it does not depend on a sensor device 11 in the vehicle itself. As with an exclusively camera-based system, the unevenness of roads (if they are completely recorded in the surface profile 8 that is provided to the control unit 7) can be predicted and the active suspension 2 or damper system can be preventively activated or preconditioned accordingly by the control unit 7.

The system can be implemented in a more cost-effective manner, since a separate 3D stereo camera which records the first 15 m in front of the vehicle 1 with high resolution does not have to be provided exclusively for recording the surface profile. The shock absorber sensor system 4 can give very sensitive feedback, since the individual shock absorbers (together with the tires 5) are in direct contact with the road and the vehicle 1 with its relatively high mass is rather sluggish and "counteracts". The gradients of the bumps may for example be recorded individually at the shock absorber sensor system 4 and/or the tire sensor system 6 of each wheel, thereby providing quasi-analog feedback (see also FIG. 3).

The method can also be used for orientation itself (matching the measured surface profile 8 with the map data) and, depending on the quality, serve as an additional sensor for localization in the environment model.

By combining measurement data from the shock absorber sensor system, such as the shock absorber position SD, and the tire sensor system, such as the tire deformation SR, with measurement data from the sensor device, the accuracy of the surface profile 8 can be increased. The robustness of the recording can be increased because the measurement data from different sensors can be created independently of one another and compared. In case of doubt, the method can increase accuracy. A possible redundancy in the event of total failure of the sensor device 11 is thereby established.

Vehicles 1 that are used for an initial recording of the surface profile 8 may have the sensor device 11, which comprises for example a 3D stereo camera, lidar scanner or laser scanner. Data recorded by the sensor device 11 in relation to surface profiles 8 can be supplemented by the shock absorber position SD and the tire deformation SR in order to increase the accuracy of the recorded surface profile 8. The shock absorber sensor system 4 and the tire sensor system 6 can thus be used for the high-precision recording of surface profiles 8.

This method could also be used for example in rail-road trains, especially high-speed trains. Here, of course, the lane width or variance to be sensed is significantly smaller. Synchronization is much easier here. Furthermore, the iterative adjustment is precise, since the train can be verified very well against the reference data while it is in motion (differentiation between disturbance variables and aging and parameter drift).

By mapping the unevenness or the entire surface profile 8, other vehicles 1 or combinations could also be predictively stabilized by their active suspensions 2.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for adapting a transfer function of an active suspension of a vehicle, comprising:
    storing a surface profile of a section of road along which the vehicle drives in a control unit of the vehicle, wherein the surface profile is generated by the control unit of the vehicle on the basis of a shock absorber position, a tire deformation and recorded values of a sensor device set up to record uneven surfaces of the section of road, wherein the surface profile comprises an x-y-z coordinate system, wherein the x-y-z coordinate system defines an x-y plane wherein the distance between two uneven surfaces in the x-direction and y-direction synchronize the current geographical position of unevenness;
    activating the active suspension by the control unit according to a predetermined transfer function for adaptation to the surface profile with adjustment values to compensate for unevenness of the surface profile, wherein the surface profile, a current geographical position of the vehicle, a current speed, respective alignment of the wheels and a weight of the vehicle are provided as input variables for the predetermined transfer function, and wherein the adjustment values comprise a damping factor and valve settings of shock absorbers;
    recording vertical accelerations while driving along the section of road with at least one of a shock absorber sensor system and a tire sensor system;
    transferring the recorded vertical accelerations to the control unit;
    transferring the adjustment values and the recorded vertical accelerations from the vehicle to an external central computer;
    calculating the adjustment values for the section of road by the external central computer according to the predetermined transfer function; and
    transferring the adjustment values to the control unit for activating the active suspension.

2. The method as claimed in claim 1, wherein the external central computer determines a deviation of the recorded vertical accelerations from expected vertical accelerations calculated for the section of road using a vehicle-specific reference model.

3. The method as claimed in claim 2, wherein the reference model is adapted from the deviation by the central computer.

4. The method as claimed in claim 2, further comprising:
    generating an adapted transfer function from the deviation by the central computer and
    transferring the adapted transfer function to the control unit; and replacing the predetermined transfer function in the control unit with the adapted transfer function.

5. The method as claimed in claim 1, wherein the surface profile is recorded by the sensor device of the vehicle while the section of road is being driven along or on a previous occasion when the section of road was driven along and stored in the control unit.

6. The method as claimed in claim 1, further comprising transferring the surface profile from the vehicle to the external central computer.

* * * * *